(12) United States Patent
Iwamoto

(10) Patent No.: US 8,395,832 B2
(45) Date of Patent: Mar. 12, 2013

(54) IMAGE PROCESSING APPARATUS

(75) Inventor: Takara Iwamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 785 days.

(21) Appl. No.: 12/574,778

(22) Filed: Oct. 7, 2009

(65) Prior Publication Data

US 2010/0091348 A1 Apr. 15, 2010

(30) Foreign Application Priority Data

Oct. 10, 2008 (JP) ................................. 2008-263703

(51) Int. Cl.
*G03F 3/08* (2006.01)
*H04N 1/60* (2006.01)
*G06K 9/00* (2006.01)

(52) U.S. Cl. .......... 358/518; 358/1.9; 358/520; 382/167

(58) Field of Classification Search .................. 358/1.9, 358/522, 520, 518, 521, 523, 538; 382/167, 382/162
See application file for complete search history.

(56) References Cited

U.S. PATENT DOCUMENTS

| | | | | |
|---|---|---|---|---|
| 5,194,945 A * | 3/1993 | Kadowaki et al. | ............ | 358/520 |
| 5,528,377 A * | 6/1996 | Hutcheson | ............ | 358/1.9 |
| 5,715,377 A * | 2/1998 | Fukushima et al. | ............ | 358/1.9 |
| 5,838,455 A * | 11/1998 | Imaizumi et al. | ............ | 358/3.1 |
| 5,940,530 A * | 8/1999 | Fukushima et al. | ............ | 382/164 |
| 6,081,343 A * | 6/2000 | Terashita | ............ | 358/1.9 |
| 6,154,288 A * | 11/2000 | Watanabe | ............ | 358/1.9 |
| 6,160,634 A * | 12/2000 | Terashita | ............ | 358/1.9 |
| 6,201,893 B1 * | 3/2001 | Shiraiwa et al. | ............ | 382/167 |
| 7,072,506 B1 * | 7/2006 | Hirota et al. | ............ | 382/162 |
| 7,433,077 B2 * | 10/2008 | Newman et al. | ............ | 358/1.9 |
| 7,525,688 B2 * | 4/2009 | Matsushima | ............ | 358/1.9 |
| 7,903,282 B2 * | 3/2011 | Furukawa et al. | ............ | 358/1.9 |
| 2002/0163658 A1 * | 11/2002 | Schluter et al. | ............ | 358/1.9 |
| 2003/0095269 A1 * | 5/2003 | Kubo et al. | ............ | 358/1.9 |
| 2003/0179398 A1 * | 9/2003 | Takano et al. | ............ | 358/1.9 |
| 2005/0057776 A1 * | 3/2005 | Furukawa et al. | ............ | 358/2.1 |
| 2005/0140997 A1 * | 6/2005 | Shirasawa | ............ | 358/1.9 |
| 2005/0280848 A1 * | 12/2005 | Seko | ............ | 358/1.9 |
| 2008/0002216 A1 * | 1/2008 | Matsushima | ............ | 358/1.9 |
| 2009/0225339 A1 * | 9/2009 | Kakigi | ............ | 358/1.9 |
| 2009/0323089 A1 * | 12/2009 | Hayasaki | ............ | 358/1.9 |

FOREIGN PATENT DOCUMENTS

JP 2005-080152 A 3/2005

* cited by examiner

*Primary Examiner* — Madelein A Nguyen
(74) *Attorney, Agent, or Firm* — Marvin A. Motsenbocker; Mots Law, PLLC

(57) ABSTRACT

An image processing apparatus includes a major color range detector detecting the major color range from the image data; a criteria density setting unit determining a density value where the largest number of pixels exists in a density histogram of the major color range as a criteria density; a first correction value derivation unit deriving a first correction value to change density values in a predetermined range higher than the criteria density to be closer to the criteria density; a second correction value derivation unit deriving a second correction value to change density values in a predetermined range lower than the criteria density to be closer to the criteria density; a correction table derivation unit deriving a gradation correction table based on the first correction value and the second correction value; and a correcting unit correcting density of the scanned image data based on the gradation correction table.

11 Claims, 11 Drawing Sheets

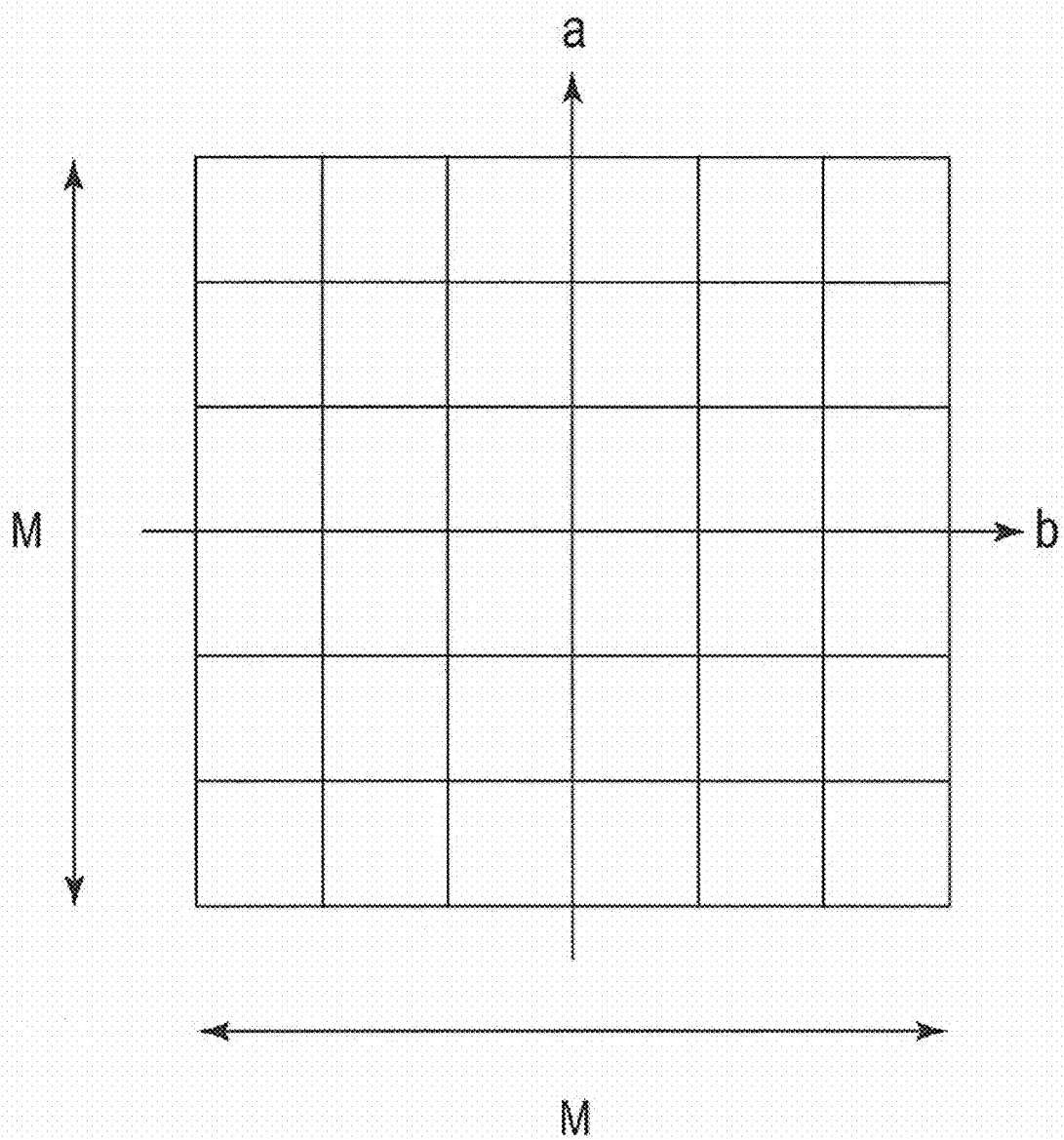

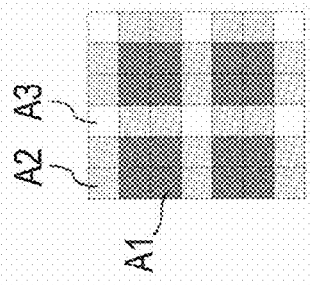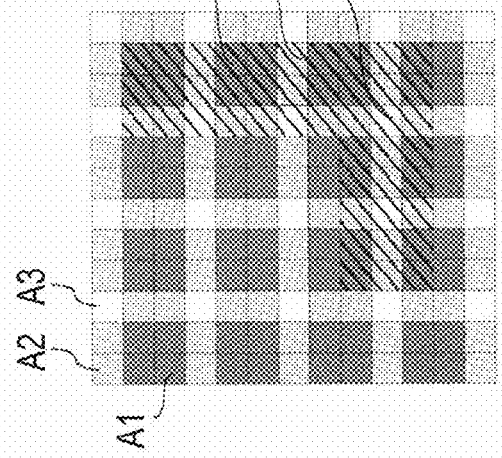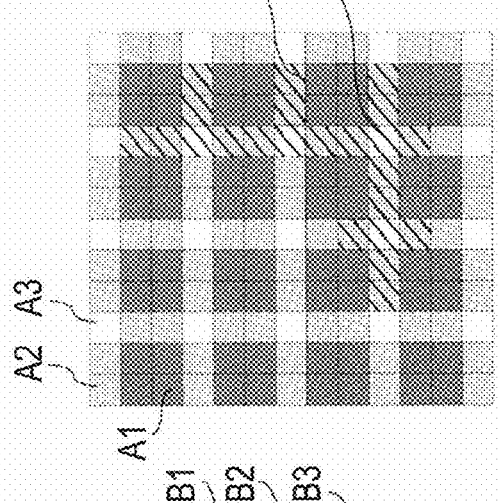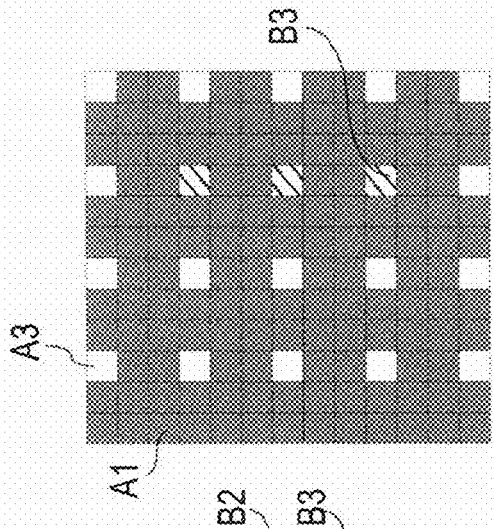

IMAGE PROCESSING APPARATUS

CROSS REFERENCE TO RELATED APPLICATIONS

This application claims priority based on 35 USC 119 from prior Japanese Patent Application No. P2008-263703 filed on Oct. 10, 2008, entitled "Image Processing Apparatus", the entire contents of which are incorporated herein by reference.

BACKGROUND OF THE INVENTION

1. Field of the Invention

The invention relates to an image processing apparatus operable to process scanned image data.

2. Description of Related Art

When a printer photocopies a front side image of an original, "traces of an image on the back side of the original" are sometimes also reproduced in the copy, which is a phenomenon where a back side image of the original is slightly printed on a print medium.

An art for preventing such a duplication of the see-through back side image is disclosed in Japanese Patent Application Laid-Open No. 2005-80152 (hereinafter, referred to as Document 1), for example.

Document 1 scans one side of an original having images on both sides, performs a classification of image data including see-through back side images transparent from the other side of the original into character areas, dot pattern areas and non-dot non-character areas, and reduces or removes the see-through back side images by increasing the screen ruling in low concentration portions in the non-dot non-character areas so as to reduce the print density of the low density portions.

SUMMARY OF THE INVENTION

Document 1, however, does not perform the see-through back image removing process in the dot pattern areas and traces of the see-through back images thus appear in the dot pattern areas.

A first aspect of the invention is an image processing apparatus operable to process scanned image data including: a major color range detector configured to detect a major color range based on scanned image data; a criteria density setting unit configured to determine a density value where the largest number of pixels exist in a density histogram of the major color range as a criteria density; a first correction value derivation unit configured to derive, based on the density information of the major color range, a first correction value to correct density values in a first predetermined range greater than the criteria density to be closer to the criteria density; a second correction value derivation unit configured to derive, based on the density information of the major color range, a second correction value to correct density values in a second predetermined range lower than the criteria density to be closer to the criteria density; a correction table derivation unit configured to derive a gradation correction table, based on the first correction value and the second correction value; and a correction unit configured to correct density values in the scanned image data, based on the gradation correction table.

According to the first aspect of the invention, the image data in the major color range is corrected so as to change density values in the first predetermined range higher than the criteria density to be closer to the criteria density and to change density values in the second predetermined range lower than the criteria density to be closer to the criteria density. This enables removal of the see-through back images in dot pattern areas as well as see-through back images in blank areas and density modulation areas in a preferable manner.

A second aspect of the invention is an image processing apparatus operable to process scanned image data, including: a major color range detector configured to detect a major color range, based on scanned image data; a background area determining unit configured to determine whether a group of pixels forming the major color range is a background area or a non-background area; a criteria density setting unit configured to determine a criteria density which is a density value where the largest number of pixels exist in a histogram of density information of the major color range; a first correction value derivation unit configured to derive a first correction value to correct density values in a first predetermined range greater than the criteria density to be closer to the criteria density, based on the density information of the major color range and based on a result determined by the background area determining unit; a second correction value derivation unit configured to derive a second correction value to correct density values in a second predetermined range lower than the criteria density to be closer to the criteria density, based on the density information of the major color range and based on the result determined by the background area determining unit; a correction table derivation unit configured to derive a gradation correction table, based on the first correction value and the second correction value; and a correction unit configured to correct density values in the scanned image data, based on the gradation correction table.

According to the second aspect of the invention, the major color range is determined by assessing whether or not the major color range corresponds to a background. This makes it possible, in non-background areas as well as background areas, to remove see-through back images while preventing deterioration of the image quality and maintaining continuity in the gradation.

BRIEF DESCRIPTION OF THE DRAWINGS

FIG. 5 is a view of the a-b plane of L*a*b color system, showing a relationship between color ranges and chromaticities a, b.

FIGS. 6A, 6B, 6C and 6D are views showing an example of a see-through back image removing process in a dot pattern area, showing lightness of each pixel.

DETAILED DESCRIPTION OF EMBODIMENTS

An image forming apparatus according to embodiments will be described herein below with reference to FIGS. 1 to 11.

Figure 2:
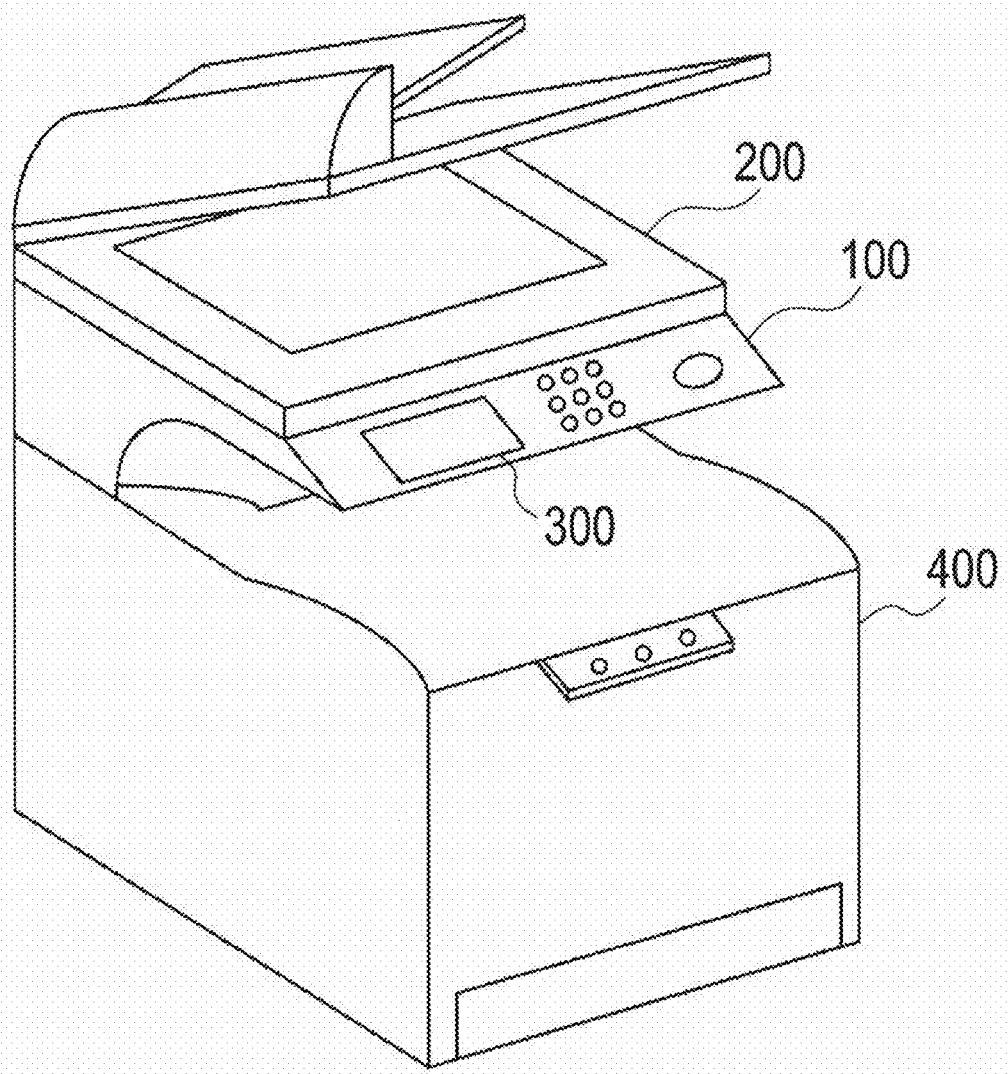
FIG. 2 is an external view of a multifunction printer which employs the invention.
Figure 3:
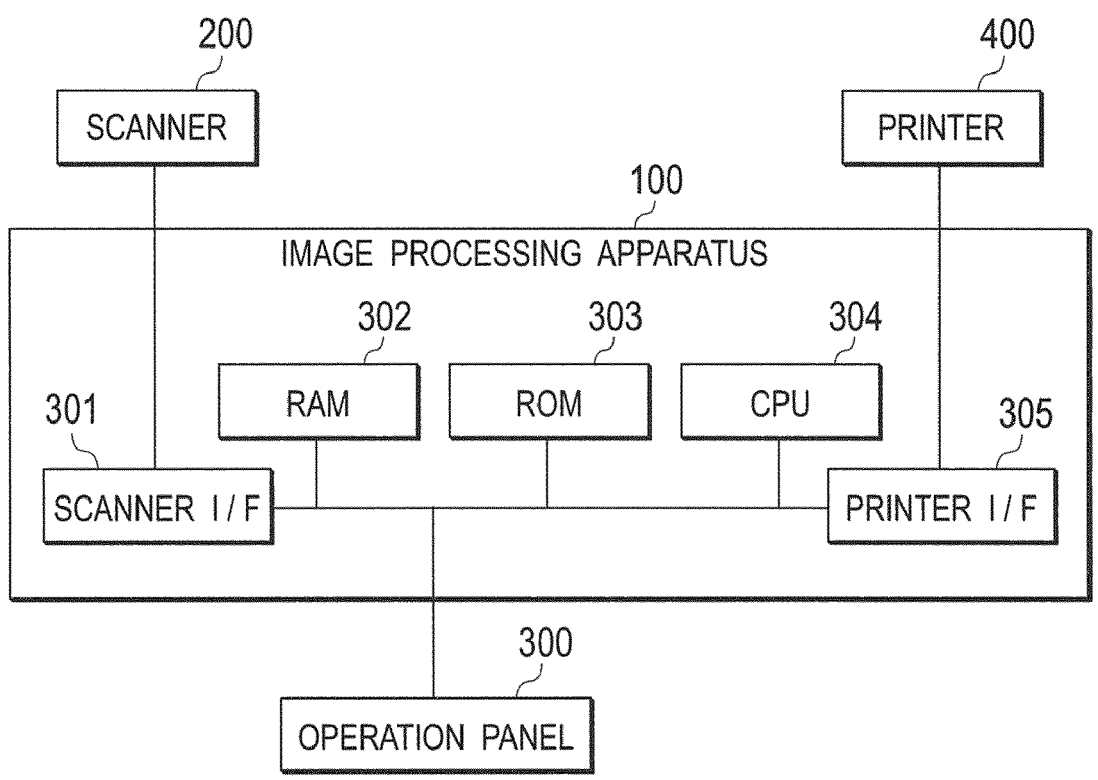
FIG. 3 is a block diagram showing a configuration of the multifunction printer.

FIG. 2 is an external view of a multifunction printer (a color multifunction printer), and FIG. 3 is a block diagram showing a configuration of the multifunction printer. The multifunction printer, as shown in FIG. 2, includes image processing apparatus 100 according to the embodiments, scanner 200 serving as an image acquisition unit, printer 400 serving as an image forming unit, and operation panel 300 serving as a user interface.

Scanner 200 includes a platen (not shown), a light source (not shown), a photoelectric conversion element (not shown), a signal processor, etc. In scanner 200, the light source emits light onto an original placed on the platen, the photoelectric conversion element receives the light reflected from the original to acquire image data, and the signal processor performs an analog to digital (a/d) conversion or the like on the image data and converts the data into RGB image data.

Image processing apparatus 100 receives image data from scanner 200, performs a see-through back image removing process which is described in detail later, and outputs the processed image data to printer 400.

Printer 400 is, for example, an electrophotographic printer which forms a toner image corresponding to the image data inputted from image processing apparatus 100 and fixes the toner image on a paper so as to print an image.

Operation panel 300 includes an operation panel body formed with numeric keys, selection keys, a scanning start button, etc. and a display panel formed of an LCD panel. Users key in operations on operation panel 300 to initiate scanning of the original, setting parameters, or displaying various information about image processing apparatus 100.

As shown in FIG. 3, image processing apparatus 100 includes CPU 304, scanner I/F 301, printer I/F 305, RAM 302, ROM 303 and the like which are connected to CPU 304. Further, CPU 304 is connected to operation panel 300, scanner I/F 301 is connected to scanner 200, and printer I/F 305 is connected to printer 400.

Scanner I/F 301 is an interface to be connected to scanner 200, and acquires image data transmitted from scanner 200 into image processing apparatus 100.

Printer I/F 305 is an interface to be connected to printer 400 and transfers image data processed by image processing apparatus 100 to printer 400.

RAM 302 is a volatile memory and temporarily stores image data acquired from scanner 200, operation data or the like in controlling.

ROM 303 is a read-only memory and stores various controlling programs for the see-through back image removing process which will be described later in detail. CPU 304 recalls the controlling programs stored in ROM 303 onto RAM 302 and executes the programs, so as to perform the see-through back image removing process in image processing apparatus 100.

[First Embodiment]

Figure 1:
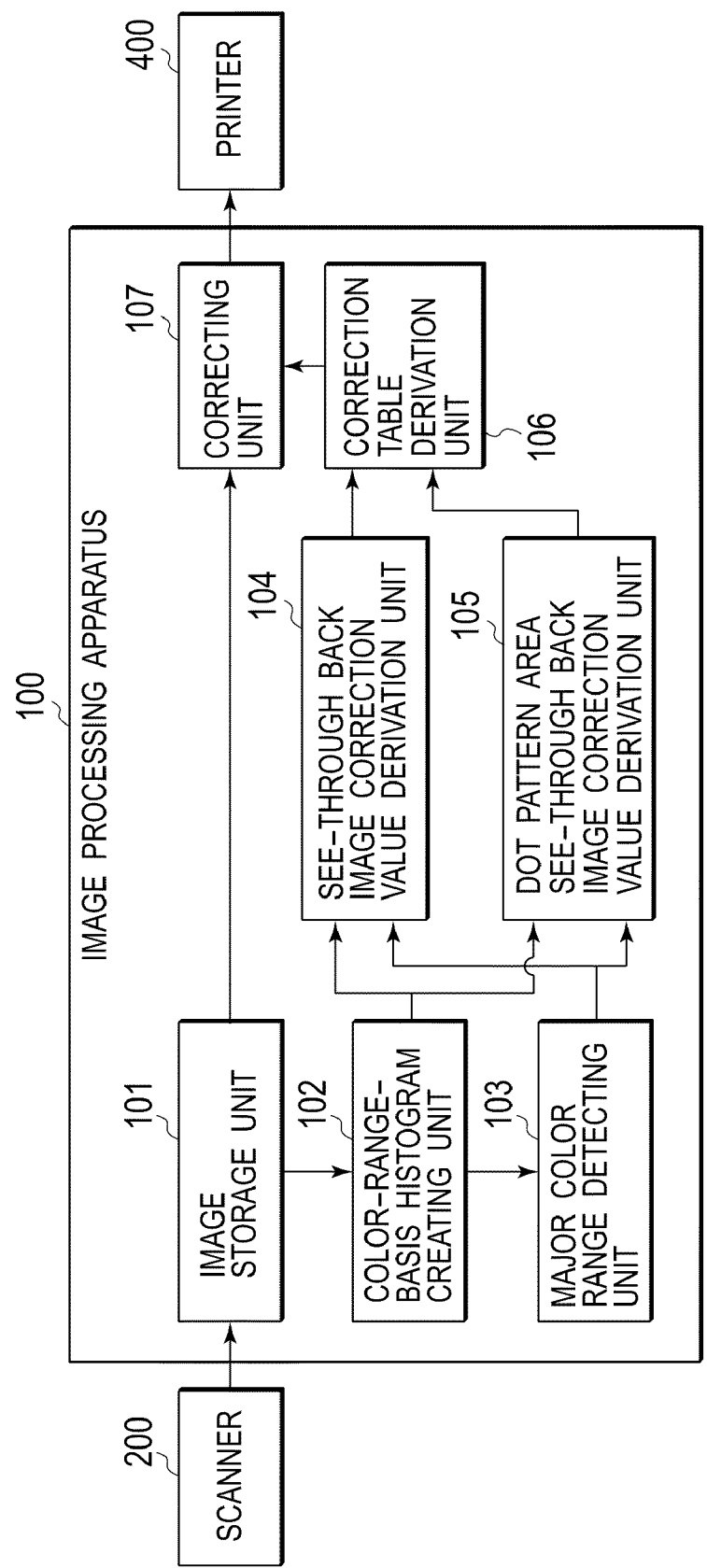
FIG. 1 is a functional block diagram of an image processing apparatus of a first embodiment.

FIG. 1 is a functional block diagram of image processing apparatus 100 of the first embodiment.

Image processing apparatus 100 includes image storage unit 101, color-range-basis histogram creating unit 102, major color range detector 103, see-through back image correction value derivation unit 104, dot pattern area see-through back image correction value derivation unit 105, correction table derivation unit 106, correcting unit 107 and the like. These units function, when CPU 304 runs the control programs for image processing on RAM 302.

Image storage unit 101 is a functional unit for converting image data composed of RGB values that is acquired from scanner 200 via scanner I/F 301, from an RGB color space into a CIEL*a*b* color space. The converted image data is stored in RAM 302 and is output to color-range-basis histogram creating unit 102 and correcting unit 107. In the CIE L*a*b* color space, dimension L represents lightness and dimensions a, b represent chromaticities.

Note that a YCbCr color space, an HLS color space or other color spaces may be used for the conversion of the image data instead of the CIE L*a*b* color space. In other words, the color space for the conversion of the image data is required to be expressed by intensity information (for example, lightness, luminance, and density) and color information (for example, value, saturation, and hue) separately.

Color-range-basis histogram creating unit 102 is a functional unit that refers to chromaticities a and b of the CIE L*a*b* color space and creates lightness histograms of respective color ranges from the image data inputted from image storage unit 101. Information about the created lightness histograms is output to the major color range detector 103, see-through back image correction value derivation unit 104, and dot pattern area see-through back image correction value derivation unit 105.

Major color range detector 103 is a functional unit that determines which color range is the most used color range in the image as the major color range, referring to each lightness histogram input from histogram creating unit 102. The result (the major color range information) is output to see-through back image correction value derivation unit 104 and dot pattern area see-through back image correction value derivation unit 105.

See-through back image correction value derivation unit 104 is a functional unit that calculates a correction value for removing see-through back images in blank areas and density modulation areas, based on the lightness histogram of the major color range that is input from the major color range detector 103, with reference to the lightness histograms input from color-range-basis histogram creating unit 102. The calculated correction value is output to correction table derivation unit 106.

Dot pattern area see-through back image correction value derivation unit 105 is a functional unit that calculates a correction value for removing see-through back images in the dot pattern areas, based on the major color range lightness histogram input from the major color range detector 103, referring to the lightness histograms input from color-range-basis histogram creating unit 102.

Correction table derivation unit 106 is a functional unit that derives a lightness value correction table for removing the see-through back images, based on the see-through back image correction value for the blank areas and density modulation areas that are input from see-through back image correction value derivation unit 104 and the see-through back image correction value for the dot pattern areas that is input from dot pattern area see-through back image correction value derivation unit 105. The calculated lightness value correction table is output to correcting unit 107.

Correcting unit 107 is a functional unit that corrects the lightness values of the image data input from image storage unit 101 based on the lightness value correction table input from correction table derivation unit 106 and converts the corrected image data into a color space (for example, a CMYK color space) used in the image forming unit (printer

400). The converted image data converted into the CMYK color space is output to printer 400 via printer I/F 305.

Figure 4:
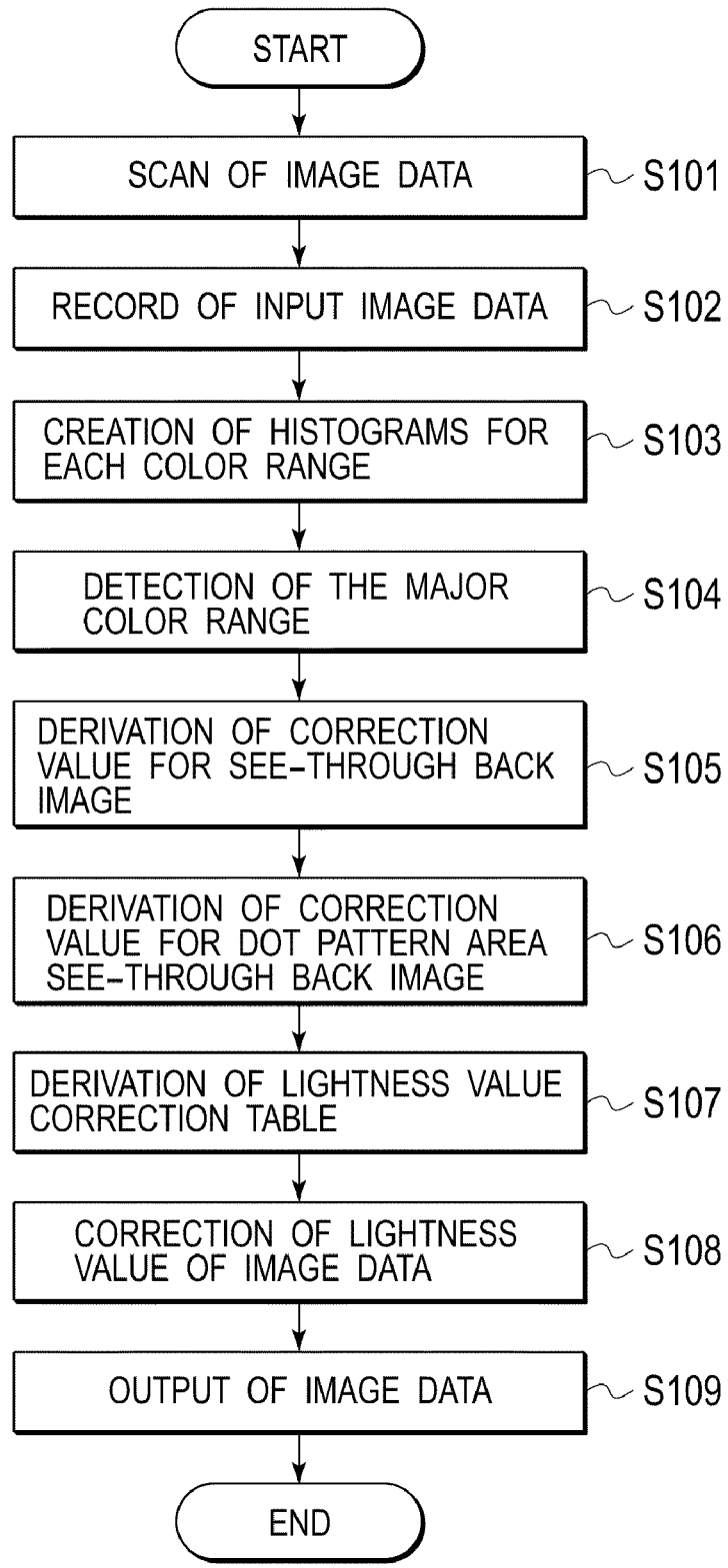
FIG. 4 is a flow chart showing processing of the image processing apparatus of the first embodiment.
Figure 7A:
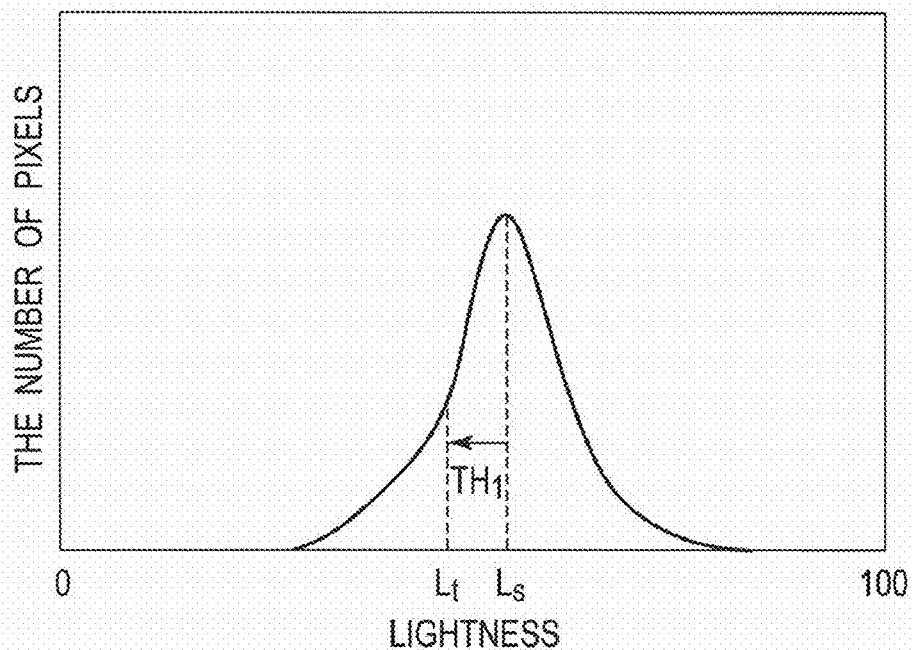
FIGS. 7A and 7B show an example of a lightness histogram and a relationship between a see-through back image correction value and a dot pattern area see-through back image correction value.
Figure 7B:
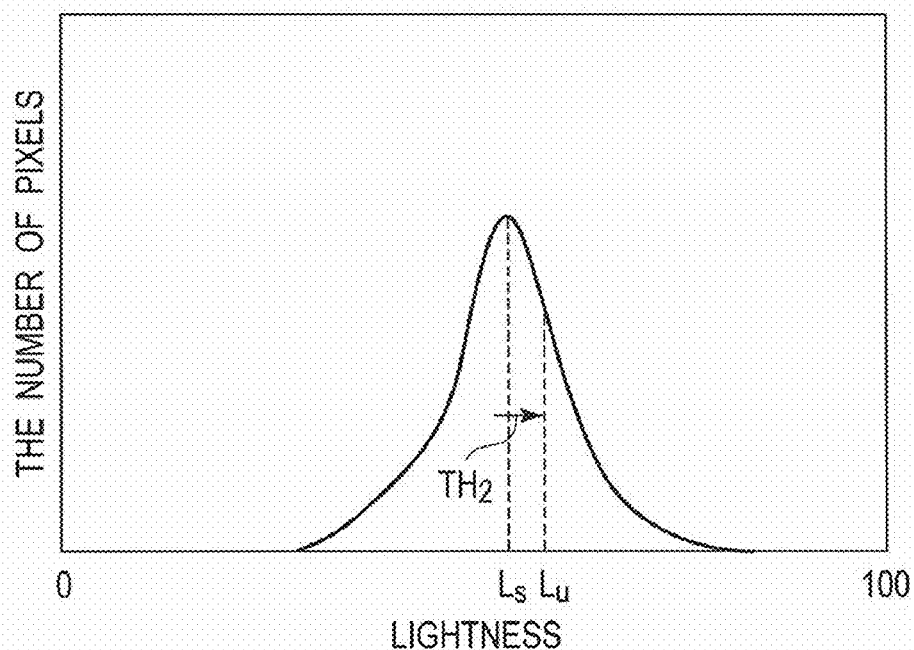
Figure 8:
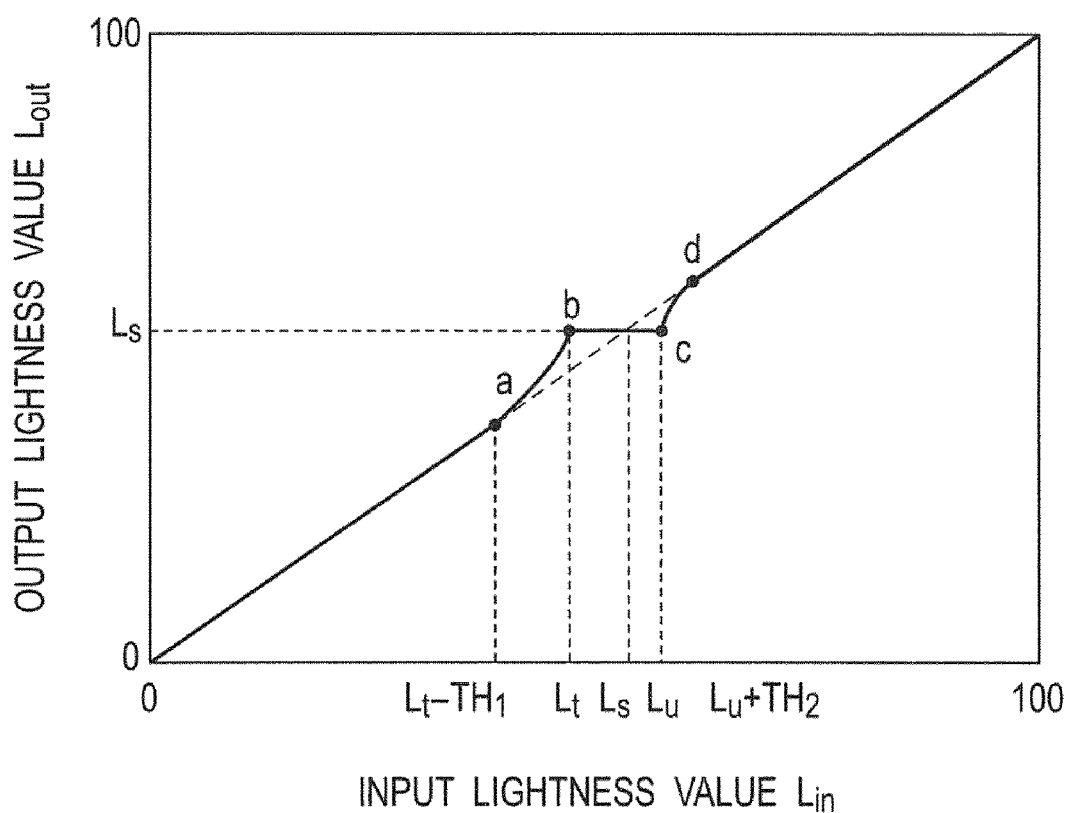
FIG. 8 is a view of an example of a lightness correction function.

Next, operation of image processing apparatus 100 having the above functional units will be described with reference to FIGS. 4 and 6A to 8. FIG. 4 is a flow chart showing operation of image processing apparatus 100 according to the first embodiment. FIGS. 6A to 6D show an example of a see-through back image removing process in the dot pattern area, showing lightness of each pixel. FIGS. 7A and 7B show an example of a lightness histogram and a relationship between a see-through back image correction value and a dot pattern area see-through back image correction value. FIG. 8 is a view of an example of a lightness correction function.

First, Step S101 in FIG. 4 scans a color document by scanner 200 and generates bitmap data composed of RGB values, based on color information of the acquired image data.

Next, step S102 converts the image data (the RGB bitmap data) input from scanner 200 into CIE L*a*b* bitmap data and stores the CIE L*a*b* bitmap data in image storage unit 101 (RAM 302). In the CIE L*a*b* color space, the L value represents lightness which ranges from 0% (black) to 100% (white). The a-value represents a mixing ratio between green and magenta wherein a greater negative value (−a) indicates a stronger green while a greater positive value (+a) indicates a stronger magenta. The b-value represents mixing ratio between blue and yellow wherein the bigger a negative value (−b), the stronger a blueness while the bigger a positive value (+b), the stronger a yellowness.

Next, in step S103, color-range-basis histogram creating unit 102 creates lightness histograms of all color ranges, based on lightness values in the image data (CIE L*a*b* bitmap data) stored in image storage unit 101. Note that, as shown in FIG. 5, the a-b plane of the CIE L*a*b* color system having a-axis and b-axis perpendicular to each other is segmented into M×M segments such that each of a-chromaticity value and b-chromaticity value extending from the minimum to the maximum value is divided by a predetermined number (M), and each of M×M segment is defined as a color range. Adjacent two of M×M segments have similar colors, respectively.

Next, in step S104, major color range detector 103 detects which color range is the major color range of the image, referring to the color range-basis lightness histograms created in step S103. In this embodiment, the total number of pixels in each lightness histogram is counted, and the histogram that has the most pixels is determined as the major color range. That is, the major color range is the color range that covers a larger area over the original image than the other color ranges.

Next, in step S105, see-through back image correction value derivation unit 104 calculates the see-through back image correction value for removing the see-through back images in the blank areas and the density modulation areas, based on the major color range detected in step S104, with reference to the color-range-basis lightness histograms created in step S103.

Such a see-through back image correction value is used for a method of removing see-through back images in white background areas. This embodiment applies this method for equalizing the lightness of the see-through back images to the lightness of the background.

FIG. 7A is a view showing an example of a lightness histogram of the major color range, wherein the vertical axis indicates the number of pixels and the horizontal axis indicates lightness: lightness 0 means black; and lightness 100 means white. As shown in FIG. 7A, the lightness value where the number of pixels is the greatest in the major color range lightness histogram is set as a criteria lightness $L_s$, and a threshold $TH_1$ (for example, $TH_1=10$) measured from the criteria lightness Ls is set.

Since the see-through back image is the back side image which is scanned transparently through the original when scanning the front image of the original, the lightness value of the image data having the see-through back image is slightly smaller than that of the normal image without the see-through back image. Therefore, the see-through back image should exist between the criteria lightness $L_s$ and a lightness value $L_s-TH_1$. This embodiment thus calculates the see-through back image correction value $L_t$ ($L_t=L_s-TH_1$) as a lightness value for equalizing the lightness of the see-through back image to the criteria lightness $L_s$.

Note that this embodiment sets threshold $TH_1$ as a predetermined fixed value, however, threshold $TH_1$ may be calculated based on the peak value in the histogram and the ratio of the peak value, or, threshold $TH_1$ may be inputted arbitrarily by users by using operation panel 300.

Next, in step S106, dot pattern area see-through back image correction value derivation unit 105 calculates the dot pattern area see-through back image correction value for correcting the see-through back image in the dot pattern area, based on the major color range detected in step S104, with reference to the color-range-basis histograms created in step S103.

FIG. 6A is a view of a dot pattern area of a scanned image showing lightness of each pixel in the dot pattern area of the scanned original, wherein there are pixels A1 that have low lightness values, pixels A3 that have high lightness values, and pixels A2 that have moderate lightness values, which occurs since the dot pattern area is formed of high density developer (for example, toner) areas (low lightness areas) and low density developer area (high lightness area) in order to express the halftone of the dot pattern area by an area coverage modulation.

FIG. 6B is a view of a group of pixels of a dot pattern area having a see-through back image of a reversing character of "L", wherein there are low lightness pixels A1, high lightness pixels A3 and moderate lightness pixels A2 as these exist in FIG. 6A, as well as pixels B1, B2, B3. Pixels B1, B2, B3 effected by the see-through back image have lower lightness values than lightness values of pixels A1, A2, A3, respectively, while pixels B1, B2, B3 should have the same lightness values as the pixels A1, A2, A3 without the see-through back images.

As shown in FIG. 6B, the see-through back image in the dot pattern area cannot be removed in higher lightness pixels than criteria lightness $L_s$ by step S105, that is, merely equalizing the lightness values of the lower lightness pixels which are lower than criteria lightness $L_s$ to criteria lightness $L_s$ based on see-through back image correction value $L_t$. For example, if criteria lightness $L_s$ is lightness (LA1) of pixels A1 which is low lightness in dot pattern area, step S105 can remove the see-through back image in pixels B1 but cannot remove the see-through back image in pixels B2, B3, as shown in FIG. 6C.

In light of this, step S106 corrects by equalizing the lightness values of the higher lightness pixels that have higher lightness values than criteria lightness $L_s$ of the major color range to critical lightness $L_s$ in the dot pattern area.

That is, as shown in FIG. 7B, step S106 sets predetermined threshold $TH_2$ (for example, $TH_2=8$) with respect to criteria lightness $L_s$, and calculates lightness values $L_u$ ($L_u=L_s+TH_2$) serving as the dot pattern area see-through back image correction value for equalizing the lightness values of the pixels that have higher lightness values than criteria lightness $L_s$.

FIG. 6D is a view of the group of the pixels that is corrected using the dot pattern area see-through back image correction value, showing lightness of each pixels. As shown in FIG. 6D, the lightness values of pixels A1, B1, A2 and B2 is equalized to the lightness (LA1) of pixels A1, so that the pixels of the entire see-through back image have a substantially flat lightness value.

Note that, depending on the setting of threshold $TH_2$, the lightness of pixels B3 having the see-through back image on high lightness pixels A3 may remain as shown in FIG. 6D, after the above correcting process. However, since the lightness value of moderate lightness pixels A2 is corrected to be the lightness value of pixels A1 as described above, pixels B3 having the see-through back image are visually less noticeable. Therefore, this greatly reduces the duplication of those see-through back images.

Further, threshold $TH_2$ may be set to a larger value to increase the level of removing see-through back images (that is, to expand the range of lightness value to be corrected), so that the lightness value of pixels B3 having the see-through back image can be corrected. In this regard, a higher level of removing the see-through back image can cause a worse gradation expression of the image. Therefore, it is preferable to set threshold $TH_2$, considering the balance between the level of removing the see-through back image and the gradation expression.

Although this embodiment sets threshold $TH_2$ as a fixed value, threshold $TH_2$ may be calculated based on the peak in the lightness histogram and its ratio, or threshold $TH_2$ may be input by users via operation panel 300.

Next, in step S107, correction table derivation unit 106 calculates a lightness value correction table for the image data, based on see-through back image correction value $L_t$ acquired in step S105 and dot pattern area see-through back image correction value $L_u$ acquired in step S106.

In FIG. 8, the horizontal axis indicates input lightness values and the vertical axis indicates output lightness values. Value 0 means black and value 100 means white in both of the axes in FIG. 8. As shown in FIG. 8, a lightness correction function is derived or calculated such that, where input lightness values $L_{in}$ are in a range of $L_t$ to $L_u$ ($L_t \leq L_{in} < L_u$), output lightness values $L_{out}$ are uniformly converted to criteria lightness $L_s$, and, in order to prevent discontinuities in gradation (gradation discontinuity) caused by this abrupt conversion, a straight line segment defined by $L_{out}=L_{in}$ is continuously and smoothly connected to point b ($L_t$, $L_s$) and a straight line segment defined by $L_{out}=L_{in}$ is continuously and smoothly connected to point c ($L_u$, $L_s$).

More specifically, step S107 derives the lightness correction function such that the straight line segments defined by $L_{out}=L_{in}$ appears in the range of 0 to $L_t$–$TH_1$ ($0 \leq L_{in} < L_t$–$TH_1$) and in the range of $L_u$+$TH_2$ to 100 ($L_u$+$TH_2 \leq L_{in} \leq 100$); a cubic curve appears in the range of $L_t$–$TH_1$ to $L_t$ ($L_t$–$TH_1 \leq L_{in} < L_t$) wherein the cubic curve passes point "a" ($L_t$–$TH_1$, $L_t$–$TH_1$) and point "b" ($L_t$, $L_s$) and its error sum of squares is the minimum with respect to the line defined by $L_{out}=L_{in}$; a cubic curve appears in the range of $L_u$ to $L_u$+$TH_2$ ($L_u \leq L_{in} < L_u$+$TH_2$) wherein the cubic curve passes point "c" ($L_u$, $L_s$) and point "d" ($L_u$+$TH_2$, $L_u$+$TH_2$) and its error sum of squares is the minimum with respect to the line defined by $L_{out}=L_{in}$; and the straight line segment defined by $L_{out}=L_s$ appears in the range of $L_t$ to $L_u$ ($L_t \leq L_{in} < L_u$).

The lightness value correction table is created, based on the input-output relation of the acquired lightness correction function.

Next, in step S108, correcting unit 107 corrects lightness values of the image data stored in image storage unit 101, based on the lightness value correction table created in step S107. This lightness correction forms image data in which the see-through back images are removed from the major color range of the scanned image data.

Next, in step S109, correcting unit 107 converts the lightness-corrected image data (RGB value) into an output color space (for example, CMYK color space) that is used in printer 400 and outputs the converted data to printer 400.

Based on this converted image data signal, printer 400 forms an image on a medium such as a print medium so as to complete a printout.

According to the first embodiment described above, for the major color range, lightness values within a range between the criteria lightness values and a predetermined lightness value that is lower than the criteria lightness value are corrected to be equalized to the criteria lightness value, and lightness values within a range between the criteria lightness value and a predetermined lightness value that is higher than the criteria lightness value are corrected to be equalized to the criteria lightness value. This operation can suitably remove see-through back images from dot pattern areas as well as blank areas and density modulation areas.

[Second Embodiment]

Figure 9:
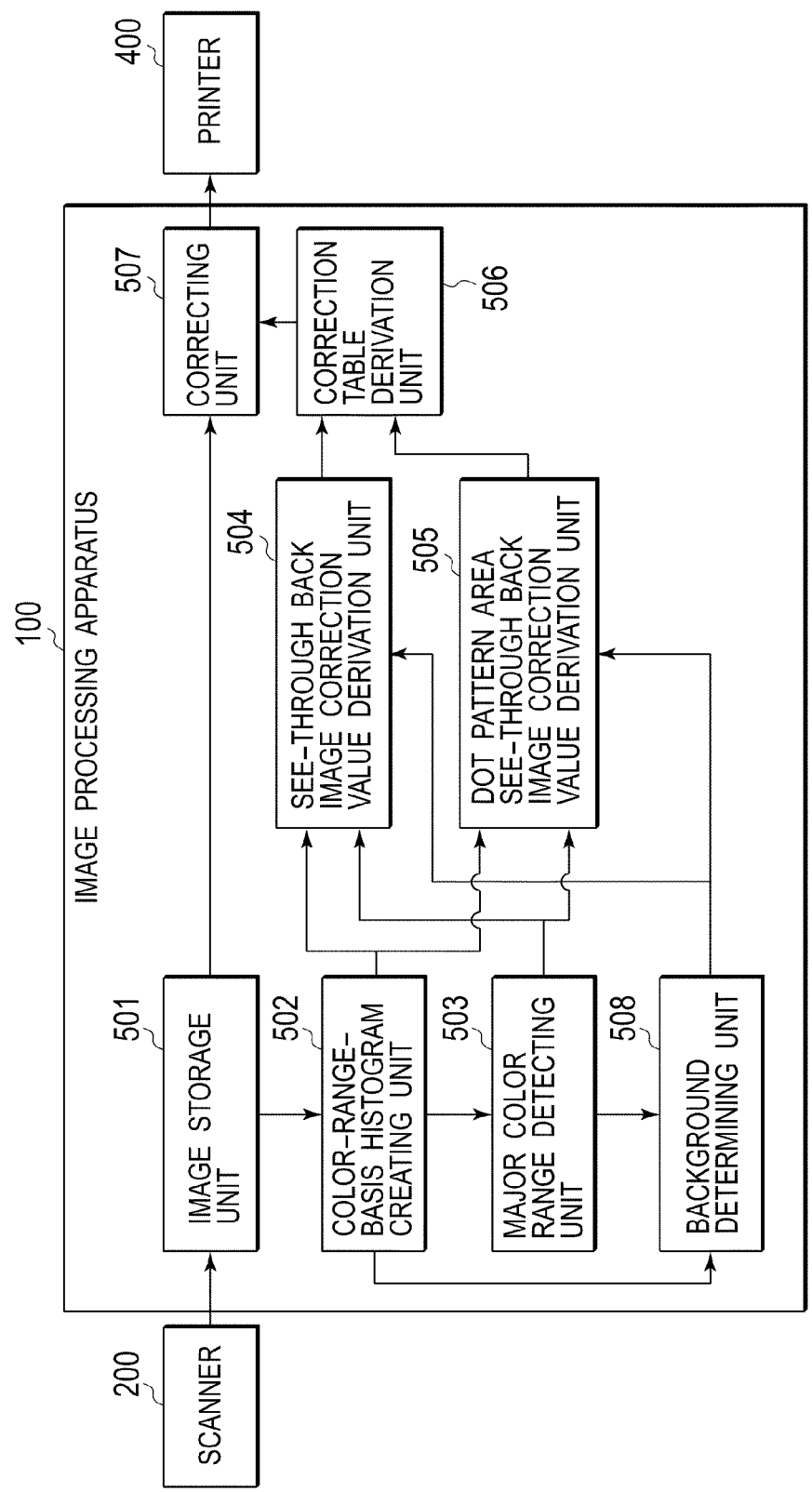
FIG. 9 is a view of a functional block diagram of an image processing apparatus according to a second embodiment.

FIG. 9 is a functional block diagram of image processing apparatus 100 according to a second embodiment.

Image processing apparatus 100 comprises image storage unit 501, color-range-basis histogram creating unit 502, major color range detecting unit 503, see-through back image correction value derivation unit 504, dot pattern area see-through back image correction value derivation unit 505, correction table derivation unit 506, correction unit 507, background area determining unit 508 and the like. Similarly to the first embodiment, these units function when CPU 304 runs corresponding image processing control programs on RAM 302.

Note that image storage unit 501, correction table derivation unit 506 and correction unit 507 in the second embodiment are the same as or similar to image storage unit 101, correction table derivation unit 106 and correcting unit 107 of the first embodiment (FIG. 1), respectively, and thus description thereof will be omitted.

Color-range-basis histogram creating unit 502 is a functional unit that creates lightness histograms of respective color ranges, referring to chromaticities a and b of a CIE L*a*b* color space, based on the image data input from image storage unit 501. Information about the created lightness histograms is output to the major color range detecting unit 503, see-through back image correction value derivation unit 504, dot pattern area see-through back image correction value derivation unit 505 and background area determining unit 508.

Major color range detecting unit 503 is a functional unit that detects which color range is the most used color range in the image as the major color range, referring to the lightness histograms input from color-range-basis histogram creating unit 502. The result (information about the major color range) is output to see-through back image correction value derivation unit 504, dot pattern area see-through back image correction value derivation unit 505 and background area determining unit 508.

Background area determining unit 508 is a functional unit that refers to the lightness histograms of respective color ranges input from color-range-basis histogram creating unit 502 and determines whether a group of pixels of the major color range input from the major color range detecting unit 503 corresponds to a background area or a non-background area. The result is output to see-through back image correction value derivation unit 504 and dot pattern area see-through back image correction value derivation unit 505.

See-through back image correction value derivation unit 504 is a functional unit that refers to the major color range lightness histogram input from the major color range detecting unit 503 and calculates a correction value for removing see-through back images from blank areas and density modulation areas, with reference to the lightness histograms input from color-range-basis histogram creating unit 502, based on the determination result of background area determining unit 508 (that is, whether the group of pixels of the major color range corresponds to a background area or a non-background area). The acquired correction value is output to correction table derivation unit 506.

Dot pattern area see-through back image correction value derivation unit 505 is a functional unit that refers to the lightness histograms input from color-range-basis histogram creating unit 502 and derivates a correction value for removing see-through back images from dot pattern areas, with reference to the major color range lightness histogram input from the major color range detecting unit 503, based on the determination result of background area determining unit 508. The derived correction value is output to correction table derivation unit 506.

Figure 10:
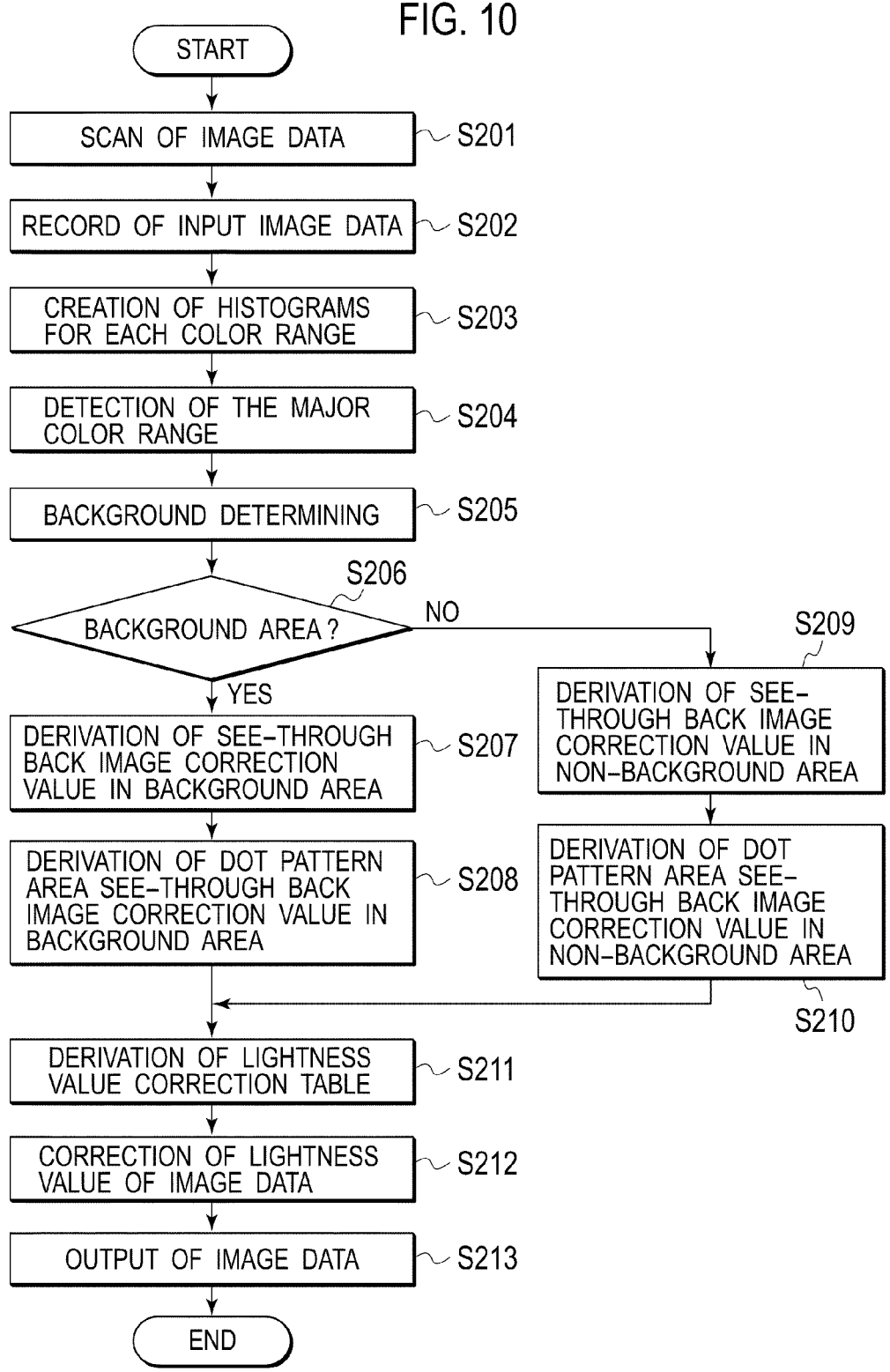
FIG. 10 is a flow chart showing processing of the image processing apparatus of the second embodiment.
Figure 11:
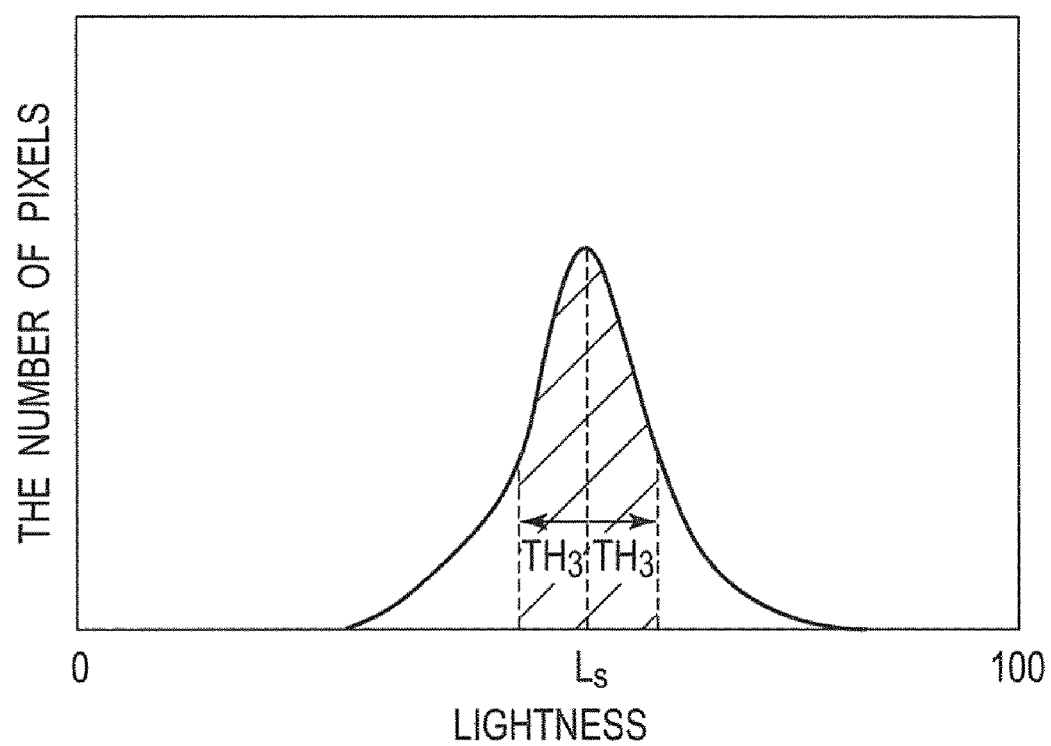
FIG. 11 is a view of an example of a lightness histogram, showing relationship between the lightness histogram and a threshold for a background determination.

Next, description of the operation of image processing apparatus 100 having the described functional units will be made with reference to FIG. 11 and FIG. 10. FIG. 10 is a flow chart showing the operation of image processing apparatus 100 of the second embodiment. FIG. 11 is a view showing a relationship between an example of the lightness histograms and a threshold value for background determination.

Steps S201 to S204 in FIG. 10 process the same or similar operations of steps S101 to S104 in the first embodiment (FIG. 4), respectively, and thus description thereof will be omitted.

Next, in step S205, background area determining unit 508 refers to the lightness histograms of respective color ranges created in S203 and determines whether or not the major color range detected in S204 corresponds to a background area. Note that a background area means an area which does not include pictures, characters and the like and thus the chromatcities and the lightness values therein are substantially uniform.

More specifically, as shown in FIG. 11, step S205 sets threshold $TH_3$ (for example, $TH_3=10$) with respect to criteria lightness $L_s$ in the major color range lightness histogram at which the number of pixels is the largest in the major color range lightness histogram and counts the number of pixels in a range between a lightness value larger than criteria lightness $L_s$ by threshold $TH_3$ and a lightness value smaller than criteria lightness $L_s$ by threshold $TH_3$. Background area determining unit 508 determines that the major color range is a background area if a proportion of the number of pixels in the range to the total pixels is equal to or larger than a predetermined value (for example, 30%), and determines that the major color range is a non-background area if the proportion is smaller than the predetermined value.

Next, step S206 refers to the determination result in step S205. If the image of the major color range is determined as a background area, the process proceeds to step S207. If the image of the major color range is determined as a non-background area, the process proceeds to step S209.

If the image of the major color range is determined as a background area, see-through back image correction value derivation unit 504 derives the see-through back image correction value ($L_t$) in step S207 and then dot pattern area see-through back image correction value derivation unit 505 derives the dot pattern area see-through back image correction value ($L_u$) in step S208. The derivation of the see-through back image correction value ($L_t$) in step S207 and the derivation of the dot pattern area see-through back image correction value ($L_u$) in step S208 are the same as or similar to steps S105, S106 in the first embodiment (FIG. 4), respectively, and thus the detail descriptions thereof are omitted in the second embodiment.

If the image of the major color range is determined as a non-background area, see-through back image correction value derivation unit 504 derives the see-through back image correction value $L_t$ of the non-background area in step S209. More specifically, step S209 derives see-through back image correction value $L_t$ ($L_t=L_s-W_1 \times TH_1$) by using threshold $TH_1$ which is the same value as the threshold used in step S207 and predetermined weighting factor $W_1$. Value $L_s$ is the criteria lightness in the major color range lightness histogram. Weighting factor $W_1$ can be set in the range between 0.0 and 1.0. As weighting factor $W_1$ becomes smaller, the level of removing see-through back images in blank areas and density modulation areas becomes weaker so that the gradation can be well maintained.

Note that this embodiment sets weighting factor $W_1$ to a constant value 0.3. However, weighting factor $W_1$ may be calculated by referring to the peak value of the histogram and the ratio thereof, or may be arbitrarily input from operation panel 300 by users.

Next, in step S210, dot pattern area see-through back image correction value derivation unit 505 derives the dot pattern area see-through back image correction value $L_u$ for the non-background area. More specifically, step S210 derives see-through back image correction value $L_u$ ($L_u=L_s+W_2 \times TH_2$) by referring to threshold $TH_2$ which is the same value as the threshold used in step S208 and a predetermined weighting factor $W_2$ (between 0.0 and 1.0). As weighting factor $W_2$ becomes smaller, the level of removing see-through back images in dot pattern areas becomes weaker so that the gradation can be well maintained. Note that this embodiment sets weighting factor $W_2$ to a constant value 0.3. However, weighting factor $W_2$ may be calculated by referring to the peak value of the histogram and the ratio thereof, or may be arbitrarily input from operation panel 300 by users.

Steps S211 to S213 are the same as or similar to steps S104 to S109 in the first embodiment (FIG. 4), and thus the descriptions thereof are omitted.

If the see-through back image correction described in the first embodiment is applied to scanned image data that does not have background areas and consists mostly of continuous tone areas such as a photograph, the image quality (gradation) may deteriorate. However, the second embodiment determines whether or not the major color range is background area and reduces a lightness range to be corrected if the major color range is determined as a non-background area, and weakens the level of removing see-through back images. This operation removes see-through back images in non-background areas as well as background areas, while preventing deterioration of the image quality and maintaining the gradation quality.

Although the image processing apparatus of the above embodiments are explained as color multifunction printers, the image processing apparatus of the invention may be used in a facsimile, a copy machine or the like. Although the color system of the above embodiments is a CIE L*a*b* color system, the invention can be applied to L*u*v*, YCbCr, HLS, or any other color systems. Although the above embodiments use lightness L as the density information, the invention may use brightness Y, density, or the like as the density information. Although the above embodiments use chromatcities a, b when detecting color ranges, the invention may use CbCr values of a YCbCr color system, other value relating chromatcities, saturation S, hue H, a deference value between the biggest value and the smallest value in RGB, or the like.

What is claimed is:

1. An image processing apparatus comprising:
a major color range detector configured to detect a major color range which is a color range among a plurality of color ranges each formed on a basis of chromaticities of pixels in scanned image data, the major color range containing a largest number of pixels of the color ranges;
a criteria density setting unit configured to determine a density value where the largest number of pixels exist in a density histogram of the major color range as a criteria density;
a first correction value derivation unit configured to derive a first correction value to correct density values, in a first predetermined range greater than the criteria density, to be closer to the criteria density, based on the density information of the major color range;
a second correction value derivation unit configured to derive a second correction value to correct density values, in a second predetermined range less than the criteria density, to be closer to the criteria density based on the density information of the major color range;
a correction table derivation unit configured to derive a gradation correction table, based on the first correction value and the second correction value; and
a correction unit configured to correct density values in the scanned image data, based on the gradation correction table.

2. The image processing apparatus of claim 1, wherein the density information is density values, lightness values, or luminance values of the pixels.

3. The image processing apparatus of claim 1, further comprising a scan unit configured to scan an original to convert into image data.

4. The image processing apparatus of claim 1, wherein a color system with a chromaticity value extending from a minimum value to a maximum value is divided into segments according to a predetermined number, and the segments are defined as the plurality of color ranges.

5. An image processing apparatus comprising:
a major color range detector configured to detect a major color range which is a color range among a plurality of color ranges each formed on a basis of chromaticities of pixels in scanned image data, the major color range containing a largest number of pixels of the color ranges;
a background area determining unit configured to determine whether a group of pixels forming the major color range is a background area or a non-background area;
a criteria density setting unit configured to determine a criteria density which is a density value where the largest number of pixels exist in a histogram of density information of the major color range;
a first correction value derivation unit configured to derive a first correction value to correct density values, in a first predetermined range greater than the criteria density, to be closer to the criteria density, based on the density information of the major color range and based on a result determined by the background area determining unit;
a second correction value derivation unit configured to derive a second correction value to correct density values, in a second predetermined range less than the criteria density, to be closer to the criteria density, based on the density information of the major color range and based on the result determined by the background area determining unit;
a correction table derivation unit configured to derive a gradation correction table, based on the first correction value and the second correction value; and
a correction unit configured to correct density values in the scanned image data, based on the gradation correction table.

6. The image processing apparatus of claim 5, wherein the first and second predetermined ranges in the non-background area are smaller than the first and second predetermined ranges in the background area.

7. The image processing apparatus of claim 5, wherein the first and second predetermined ranges in the non-background area that are set by the first and second correction value derivation units when the background area determining unit determines that the group of pixels forming the major color range corresponds to a non-background area are smaller than the first and second predetermined ranges in the background area that are set by the first and second correction value derivation units when the background area determining unit determines that the group of pixels forming the major color range corresponds to a background area.

8. The image processing apparatus of claim 5, wherein the background area determining unit determines that the group of pixels in the histogram is the background area, when a proportion of the number of pixels in a range around the criteria density to the total number of pixels in the histogram is larger than a predetermined proportion.

9. The image processing apparatus of claim 5, wherein the density information is density values, lightness values, or luminance values of the pixels.

10. The image processing apparatus of claim 5, further comprising a scan unit configured to scan an original to convert into image data.

11. The image processing apparatus of claim 5, wherein a color system with a chromaticity value extending from a minimum value to a maximum value is divided into segments according to a predetermined number, and the segments are defined as the plurality of color ranges.

* * * * *